US007872328B2

(12) United States Patent
Kiyomura

(10) Patent No.: US 7,872,328 B2
(45) Date of Patent: Jan. 18, 2011

(54) CAPACITOR ELECTRODE THAT CONTAINS OXYGEN AND NITROGEN

(75) Inventor: Takakazu Kiyomura, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 12/326,964

(22) Filed: Dec. 3, 2008

(65) Prior Publication Data
US 2009/0141429 A1 Jun. 4, 2009

(30) Foreign Application Priority Data
Dec. 3, 2007 (JP) .............................. 2007-312469

(51) Int. Cl.
 *H01L 29/45* (2006.01)
(52) U.S. Cl. ............... 257/532; 257/769; 257/E29.143; 257/E29.343
(58) Field of Classification Search .................. 257/769
 See application file for complete search history.

(56) References Cited

U.S. PATENT DOCUMENTS 5,520,992 A 5/1996 Douglas et al.
6,833,576 B2 * 12/2004 Agarwal et al. ............. 257/300

OTHER PUBLICATIONS

C.M. Chu et al., Cylindrical Ru / SrTiO$_3$/ Ru Capacitor Technology for 0.11 μm Generation DRAMs, 2001 Symposium on VLSI Technology Digest of Technical Papers.

* cited by examiner

*Primary Examiner*—Stephen W Smoot
(74) *Attorney, Agent, or Firm*—Young & Thompson

(57) ABSTRACT

A capacitor electrode includes a first surface and a second surface which are arranged opposite each other. The capacitor electrode contains an oxygen atom and a nitrogen atom. The capacitor electrode includes a position A where the oxygen atom exhibits a largest concentration value, between the first surface and the second surface in a thickness direction. The nitrogen atom is present only in an area closer to the first surface than the position A.

10 Claims, 9 Drawing Sheets

Peak value of oxygen concentration is exhibited inside electrode film
Nitrogen is present only in area closer to capacitor interface than position of peak value.

[FIG. 1]
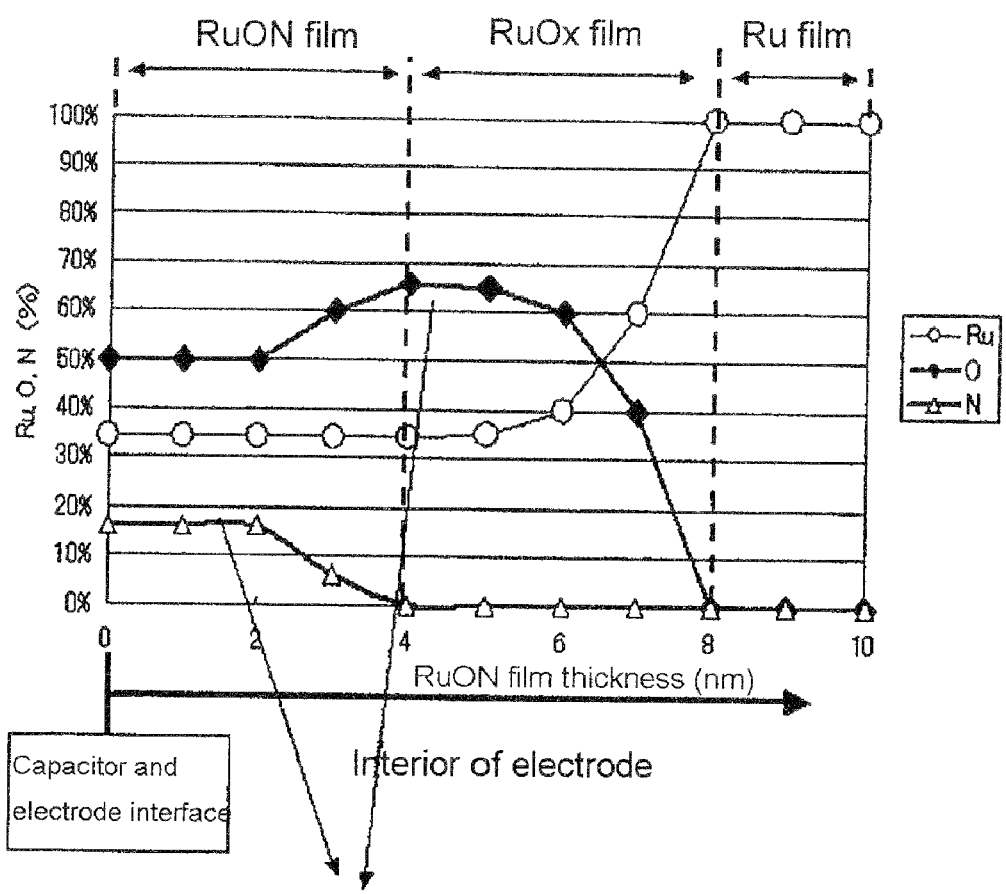
Peak value of oxygen concentration is exhibited inside electrode film
Nitrogen is present only in area closer to capacitor interface than position of peak value.

[FIG. 2]
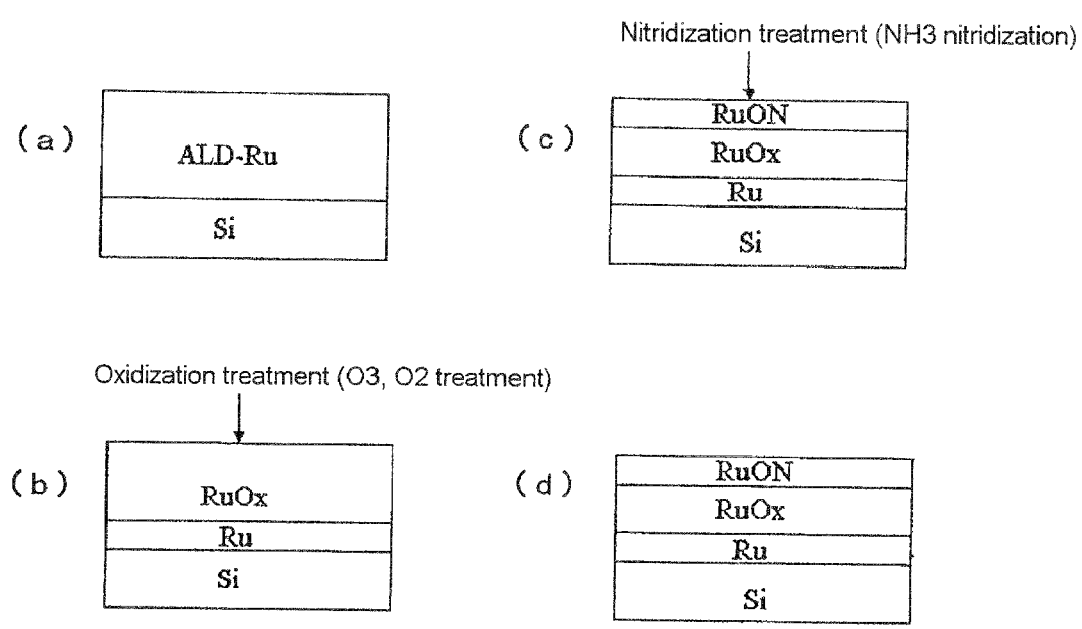

[FIG. 3]
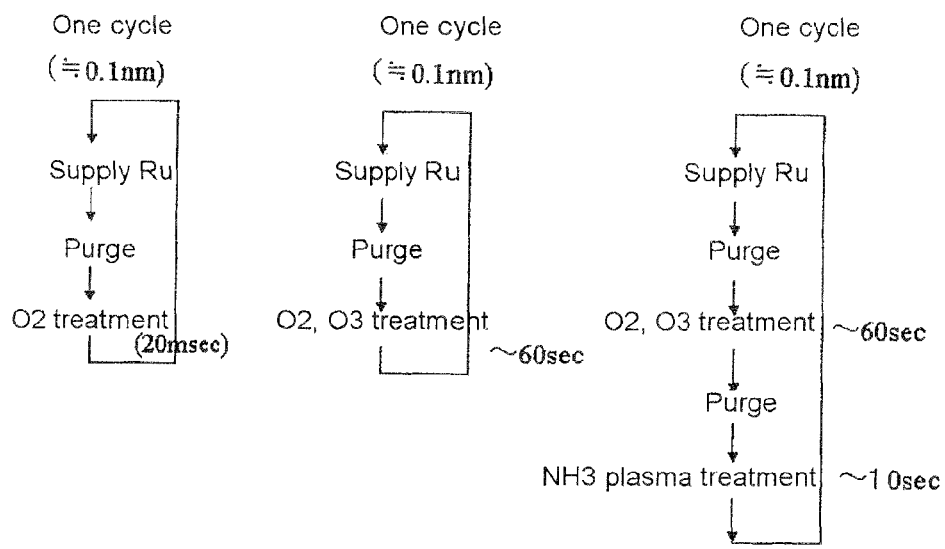
RuON film with profile of N and O is produced using different numbers of cycles of (a), (b), and (c).

[FIG. 4]
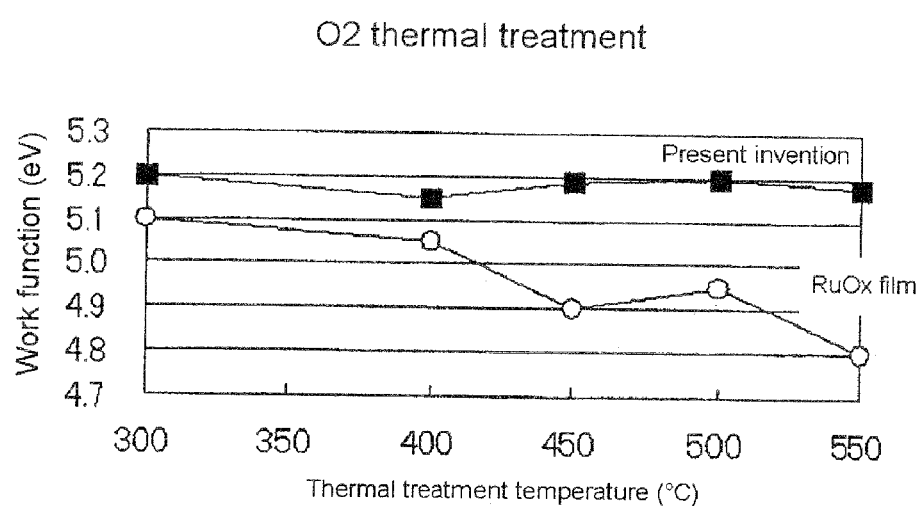
RuON film according to present invention offers higher work function than RuOx film.
Work function of RuON film is prevented from being significantly varied by thermal load, and RuON film offers acceptable heat resistance.

[FIG. 5]
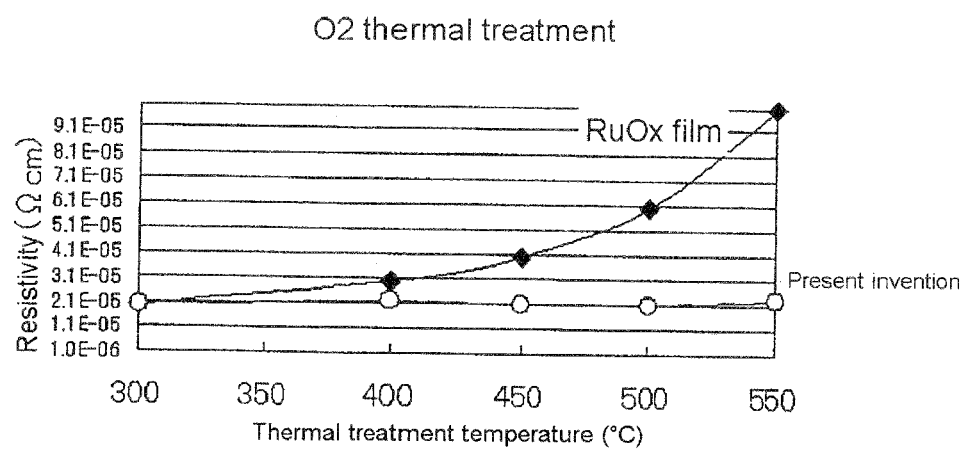
Resistivity of RuOx film is increased by thermal load, whereas RuON film according to present invention is prevented from being significantly varied by thermal load. RuON film also offers acceptable heat resistance.

[FIG. 6]
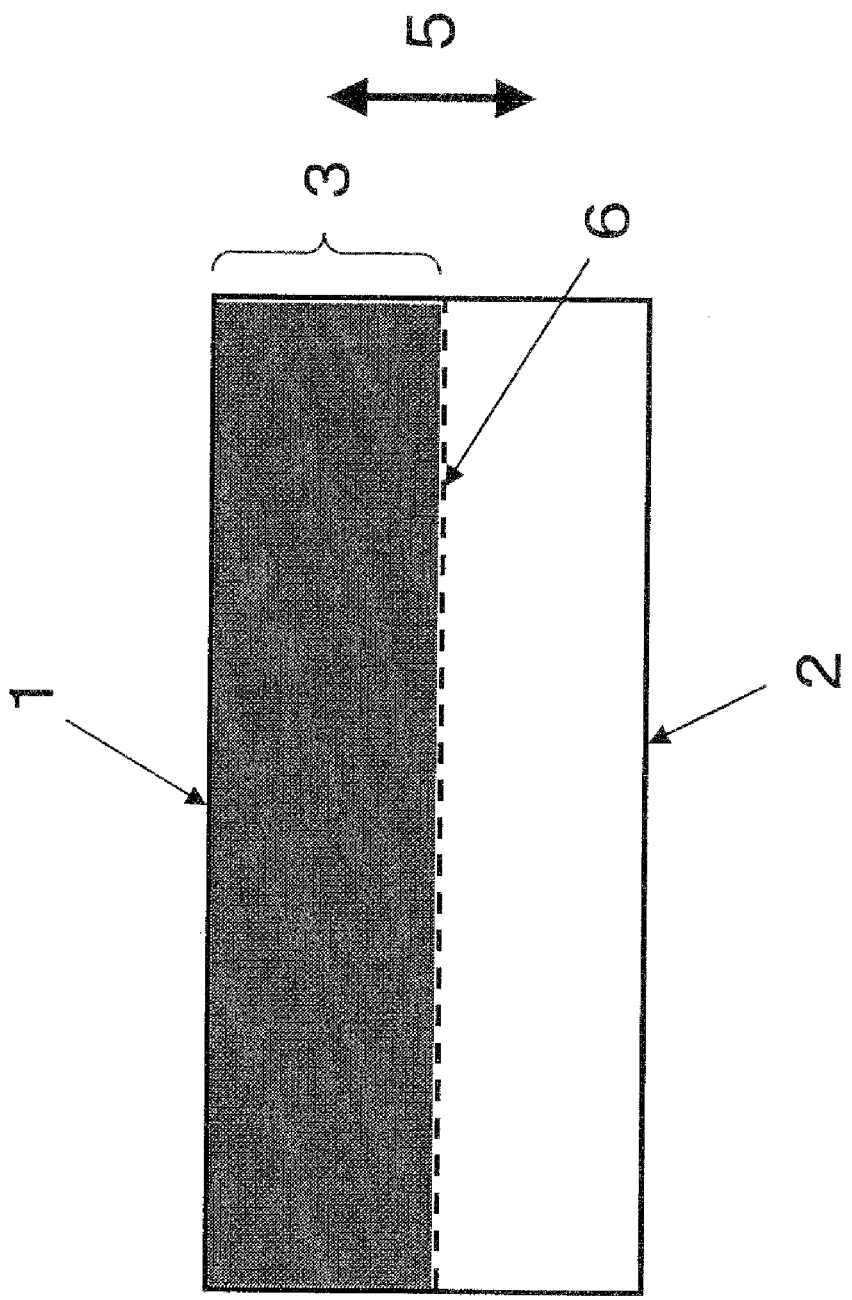

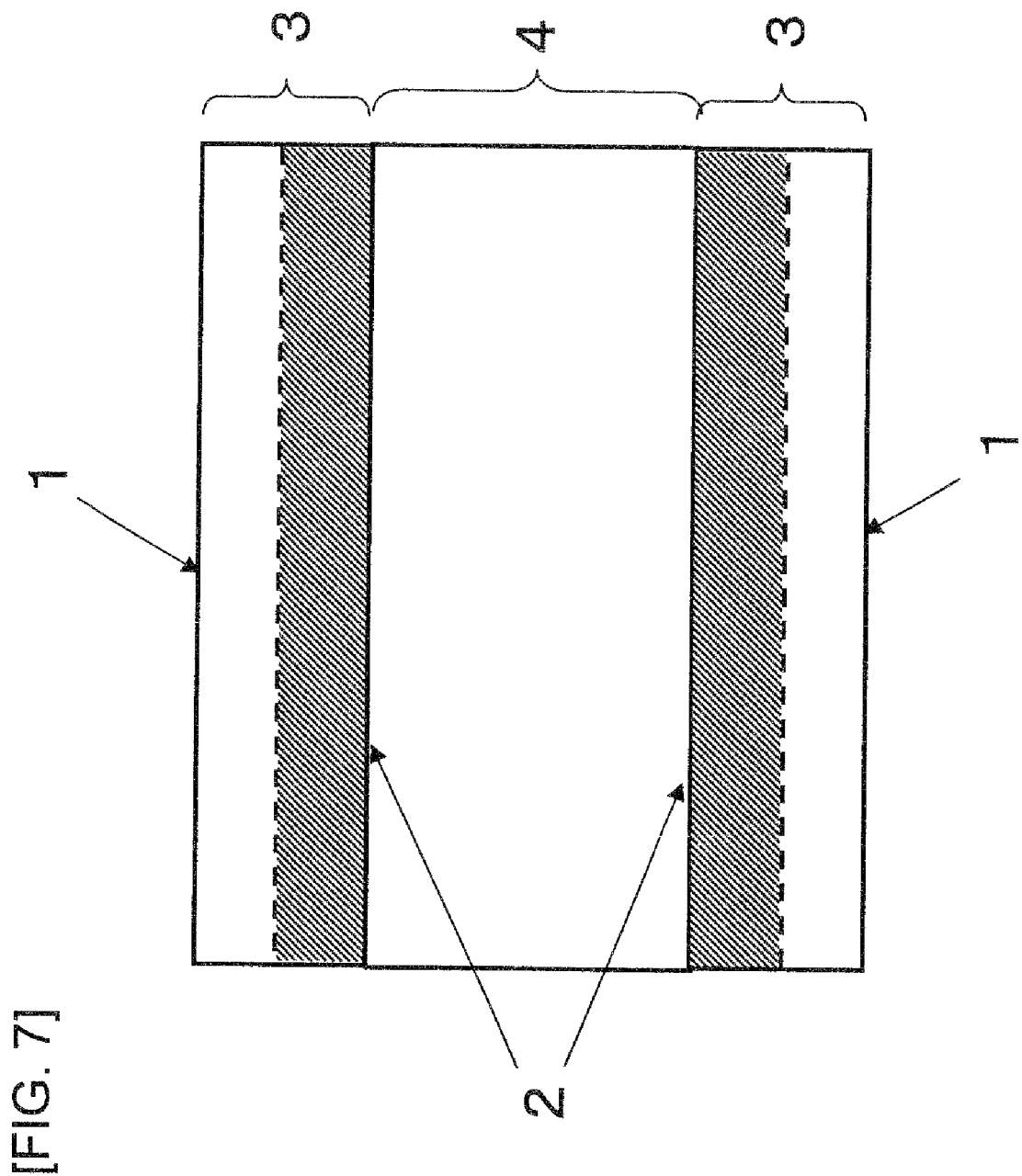

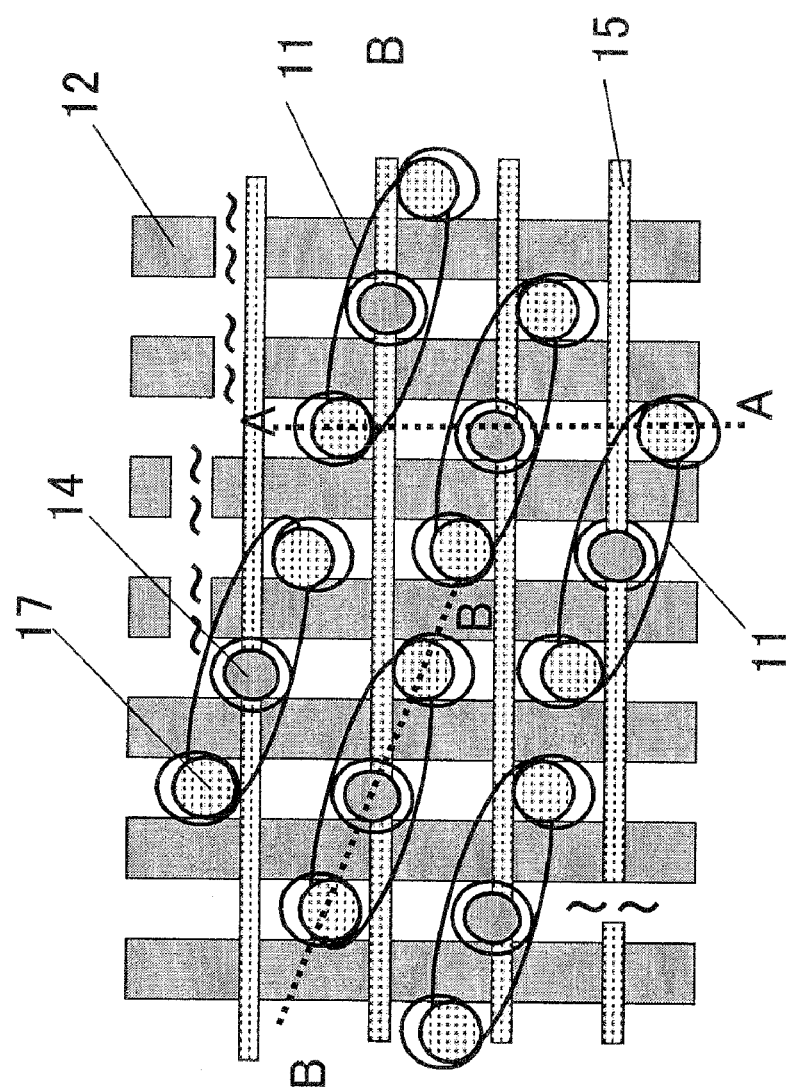

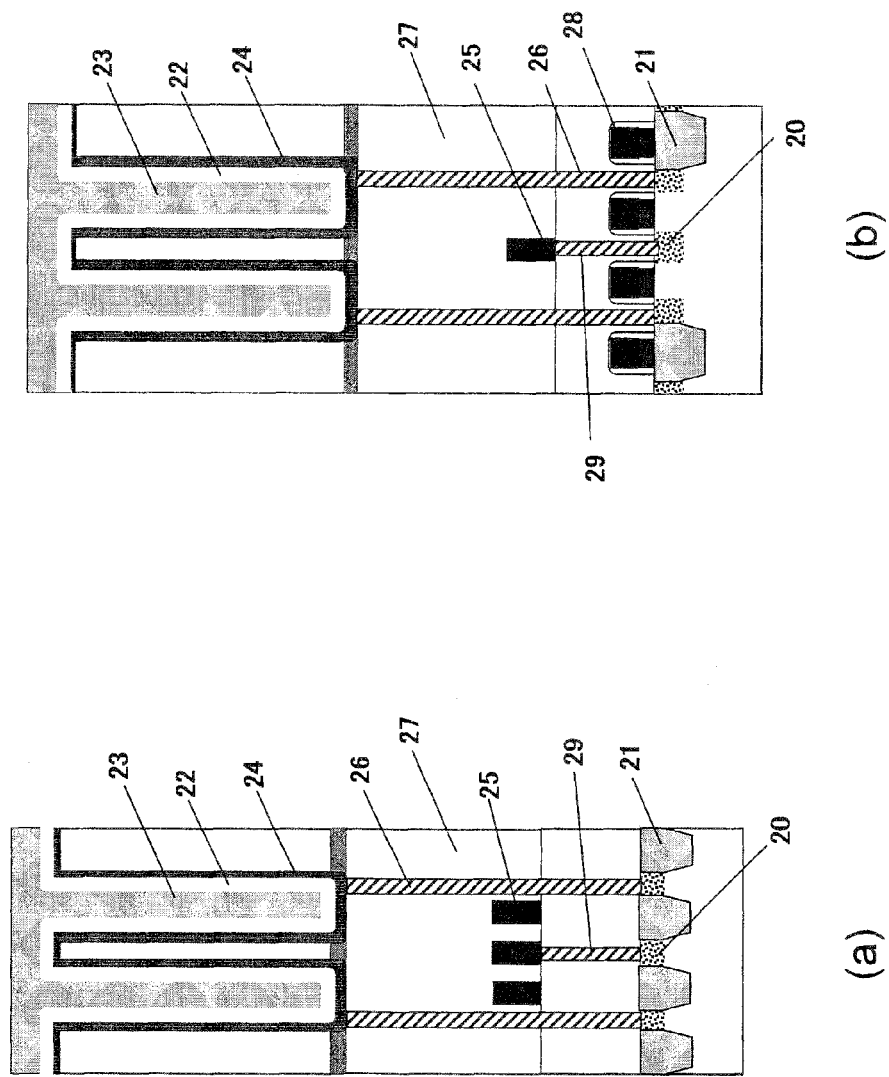
[FIG. 9]

CAPACITOR ELECTRODE THAT CONTAINS OXYGEN AND NITROGEN

This application is based upon and claims the benefit of priority from Japanese Patent Application No. 2007-312469, filed on Dec. 3, 2007, the disclosure of which is incorporated herein in its entirety by reference.

BACKGROUND OF THE INVENTION

1. Field of the Invention

The present invention relates to a capacitor comprising a capacitor electrode with a high-dielectric-constant film and a method for manufacturing the capacitor.

2. Description of the Related Art

DRAMs have recently been increasingly miniaturized. Thus, a high-dielectric-constant film is required for an F40-nm generation (a generation for a 40-nm design rule and subsequent generations) as a dielectric film for a capacitor. For example, $SrTiO_3$ is proposed as major candidates for the high-dielectric-constant film.

On the other hand, TiN/Ti electrodes have conventionally been used as capacitor electrodes. However, when the above-described high-dielectric-constant film is used as a dielectric film, a band offset between a conduction band of a dielectric and a Fermi energy of the electrode decreases. Thus, schottky conduction disadvantageously increases leakage current. Consequently, using the TiN/Ti capacitor electrode with the high-dielectric-constant film has been difficult. Thus, an electrode with a large work function value has been required for the capacitor with the high-dielectric-constant film. In recent years, efforts have therefore been made to examine electrode materials.

For example, Pt is a material with the highest work function, However, Pt offers insufficient processability and is insufficiently practical for production of semiconductor devices such as DRAMs. An electrode material offering high processability needs to be used. Thus, efforts have been made to develop an electrode material other than Pt.

C. M. Chu, et. al., Symp. On. VLSI Tech, Dig., 2001, T4B-3 discloses a capacitor with an MIM structure (Metal-insulator-Metal; a capacitor structure with an upper electrode and a lower electrode each formed of a metal film) of Ru/SrTiO$_3$/Ru. For the capacitor in C. M. Chu, et. al., Symp. On. VLSI Tech, Dig., 2001, T4B-3, the MIM structure of Ru/SrTiO$_3$/Ru is produced and then thermally treated to improve the crystallinity of the capacitor (SrTiO$_3$). This reduces the leakage current value.

U.S. Pat. No. 5,520,992 discloses a capacitor electrode using a high-dielectric-constant film. According to U.S. Pat. No. 5,520,992, a conductive oxide/barrier metal/sub (substrate; semiconductor substrate) is formed as a lower electrode, and a high-dielectric-constant film is formed on the conductive oxide/barrier metal/sub. Then, a barrier metal/conductive oxide is formed on the high-dielectric-constant film in the high-dielectric-constant film/conductive oxide/barrier metal/sub structure as an upper electrode. Therefore, the capacitor in U.S. Pat. No. 5,520,992 has a barrier metal/conductive oxide/high-dielectric-constant film/conductive oxide/barrier metal/sub structure. Here, $RuO_x$ or the like is used as the conductive oxide, and nitride such as RuN or the like is used as the barrier metal.

However, I have now discovered that Ru, the electrode material used in C. M. Chu, et. al., Symp. On. VLSI Tech, Dig., 2001, T4B-3, is easily oxidized to vary both resistivity and work function of Ru, which thus becomes unstable (degraded heat resistance). Therefore, a reduction in leakage current value is limited as long as the single Ru film is used as a capacitor electrode. There has thus been a demand for a stable electrode material with a high work function.

Furthermore, I have now discovered that $RuO_x$, used in C. M. Chu, et. al., Symp. On. VLSI Tech, Dig., 2001, T4B-3 as conductive oxide, exhibits a work function equivalent to that of Ru metal (at most 5.1 eV). With such a conductive oxide, an oxygen defect in the film causes conduction. Thus, the resistivity and work function of the film vary according to the concentration of oxygen in the film. Moreover, when a high-dielectric-constant film for a capacitor is formed, thermal treatment is required in order to improve performance of the resulting capacitor. During the thermal treatment, a variation in oxygen concentration may vary the resistivity and work function of $RuO_x$, thus significantly degrading heat resistance.

As described above, the proposed capacitor electrodes do not use a low-electric-resistance electrode material offering a high work function and appropriate heat resistance.

Thus, as a result of keen examinations, the present inventor has found that a film with oxygen atoms and nitrogen atoms distributed therein so as to exhibit a particular concentration distribution can be used as a low-electric-resistance electrode material for the capacitor electrode which offers a high work function and appropriate heat resistance.

SUMMARY OF THE INVENTION

The present invention seeks to solve one or more of the above problems, or to improve upon those problems at least in part.

In one embodiment, there is provided a capacitor comprising:

two electrodes, each electrode including a first surface and a second surface which are arranged opposite each other; and a dielectric film formed between two electrodes in contact with the first surface of each electrode, wherein the electrode contains an oxygen atom and a nitrogen atom, the electrode includes a position A where the oxygen atom exhibits a largest concentration value, between the first surface and the second surface in a thickness direction, and the nitrogen atom is present only in an area closer to the first surface than the position A in the thickness direction.

In another embodiment, there is provided a capacitor including a electrode comprising:

a first layer containing an Ru;

a second layer containing an Ru and an oxygen atom, the second layer being in contact with the first layer;

a third layer containing an Ru, an oxygen atom, and a nitrogen atom, the third layer being in contact with the second layer.

In another embodiment, there is provided a method for manufacturing a capacitor, comprising:

(1) forming an Ru film;
(2) forming an $RuO_x$ film on the Ru film;
(3) forming an RuON film on the $RuO_x$ film;
(4) forming a dielectric film on the RuON film; and
(5) forming an electrode on the dielectric film.

BRIEF DESCRIPTION OF THE DRAWINGS

The above features and advantages of the present invention will be more apparent from the following description of certain preferred embodiments taken in conjunction with the accompanying drawings, in which:

FIG. 1 is a diagram showing a distribution of Ru, O, and N in a film thickness direction of capacitor electrode of the present invention;

FIG. 2(a), FIG. 2(b), FIG. 2(c) and FIG. 2(d) are diagrams showing a manufacturing method according to a first exemplary embodiment;

FIG. 3(a), FIG. 3(b) and FIG. 3(c) are diagrams showing a manufacturing method according to a second exemplary embodiment;

FIG. 4 is a diagram showing effects of a thermal treatment temperature on work functions of the capacitor electrode according to the present invention and a conventional RuOx film;

FIG. 5 is a diagram showing effects of the thermal treatment temperature on resistivities of the capacitor electrode according to the present invention and the conventional RuOx film;

FIG. 6 is a diagram schematically showing an example of the capacitor electrode according to the present invention;

FIG. 7 is a diagram schematically showing an example of a capacitor according to the present invention;

FIG. 8 is a diagram showing a part of a DRAM with the capacitor according to the present invention; and FIG. 9(a) and FIG. 9(b) are diagrams showing a part of the DRAM with the capacitor according to the present invention.

In the drawings, numerals have the following meanings. 1: dielectric surface, 2: second surface, 3: capacitor electrode, 4: dielectric film, 5: thickness direction, 6: position A, 12: word line (gate electrode), 14: bit contact plug, 15: bit line, 17: capacitor contact plug, 20: source/drain region, 21: isolation region, 22: dielectric film, 23: upper electrode, 24: lower electrode, 25: bit line, 26: capacitor contact plug, 27: interlayer insulating film, 28: gate electrode, 29: bit contact plug.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

1. Capacitor Electrode

A capacitor electrode with a first surface contacting a dielectric film for capacitor and a second surface located opposite the first surface. The capacitor electrode contains oxygen atoms and nitrogen atoms. The oxygen atoms exhibit the highest concentration at position A between the first surface and the second surface in a thickness direction of the capacitor electrode. The nitrogen atoms are present only in an area closer to the first surface than position A (a composition distribution of the nitrogen atoms and the oxygen atoms is hereinafter referred to as a "composition profile"). Position A is present like a surface parallel to the first and second surfaces.

The particular composition profile of the capacitor electrode prevents the work function and resistivity of the capacitor electrode from being varied by a thermal load. Thus, the heat resistance of the capacitor electrode can be improved. As a result, the capacitor electrode exhibits a small leakage current value and is stably operative even with miniaturization. In particular, since the nitrogen atoms are present only in the area closer to the first surface than position A having the oxygen atoms of the largest concentration value, the vicinity of an interface between the capacitor electrode and a capacitor can be made of a thermally stable substance with a high work function. A possible leakage current can thus be inhibited. For example, when a dielectric film is formed on the capacitor electrode during manufacture of the capacitor, even if the capacitor electrode is treated at high temperatures, the capacitor electrode offers high heat resistance. Consequently, possible variations in work function and resistivity can be varied.

The overall film thickness of the capacitor electrode is preferably 5 to 20 nm. Position A is preferably present 2 to 7 nm away from the first surface in a thickness direction of the capacitor electrode. The concentration of oxygen at position A is preferably 40 to 70 atm %. The nitrogen atoms are preferably present 0 to 2 nm away from the first surface in the thickness direction.

FIG. 6 schematically shows an example of the capacitor electrode according to the present invention. The capacitor electrode includes first surface 1 contacting a dielectric film for capacitor, and second surface 2 located opposite first surface 1. The capacitor electrode contains oxygen atoms and nitrogen atoms. The capacitor electrode includes position A (indicated by reference numeral 6) with the highest oxygen atom concentration in an area between first surface 1 and second surface 2 in thickness direction 5. Position A is shaped like a surface parallel to first surface 1 and second surface 2. The nitrogen atoms are present in only an area (indicated by a gray portion in FIG. 6) closer to the first surface than position A (indicated by reference numeral 6).

The capacitor electrode may be composed of a plurality of layers. The above-described composition profile may be formed by adjusting the concentrations of the oxygen and nitrogen atoms in each layer. Alternatively, the capacitor electrode may be a single layer with the above composition profile. The nitrogen atoms may be present in the entire area between first surface 1 and position A (indicated by reference numeral 6) or in a part of the area.

Preferably, the capacitor electrode includes a silicon substrate, an Ru film, an $RuO_x$ film, and an RuON film in this order. The Ru film includes the second surface contacting the silicon substrate. The $RuO_x$ film includes position A. The RuON film includes the first surface as a surface located opposite a surface thereof contacting the $RuO_x$ film, and contains the nitrogen atoms. In the specification, the "$RuO_x$ film" refers to a film containing Ru atoms and O atoms but not N atoms. The "RuON film" refers to a film containing Ru atoms, O atoms, and N atoms.

FIG. 2(d) shows an example of the capacitor electrode.

FIG. 1 shows an example of the composition distribution of the nitrogen and oxygen atoms in the capacitor electrode in FIG. 2(d), in the thickness direction. In FIG. 1, the position of a film thickness of 0 nm corresponds to the first surface, at which the capacitor electrode contacts the dielectric film. The position of a film thickness of about 10 nm corresponds to the second surface of the capacitor electrode. In FIG. 1, a portion with a film thickness from 0 nm to about 4 nm corresponds to the RuON film. A portion with a film thickness from about 4 to 8 nm corresponds to the $RuO_x$ film. A portion with a film thickness from about 8 to 10 nm corresponds to the Ru film. FIG. 1 indicates that in the capacitor electrode, a position with a film thickness of about 4.2 mm corresponds to position A, where the oxygen atoms exhibit the largest concentration value. FIG. 1 also indicates the nitrogen atoms are present only in the area between position A with the film thickness of about 4.2 nm and the first surface (film thickness: 0 nm).

In FIG. 1, the composition distribution of the nitrogen and oxygen atoms in FIG. 1 was measured using high resolution RBS (Rutherford backscattering spectrometry). Measurement conditions, a measurement method, and an analysis method are shown below.

(Measurement Conditions)
  Incident ion energy: 300 keV
  Ion species: He+
  Incident angle: 45 degrees to a normal perpendicular to a surface direction of a sample
  Current applied to the sample: 25 nA
  Irradiation amount: 90 μC (Measurement Method)

The sample was irradiated with He+ with an incident energy of 300 keV at an angle of 45 degrees to the normal perpendicular to the surface direction of the sample. Scattered He+ was detected at a set scattering angle using a polarized magnetic field energy analyzer.

(Analysis Method)

(1) Channels on the axis of abscissa are converted into scattering ion energy using a middle point of a high energy side edge for oxygen as a reference.

(2) A system background is subtracted.

(3) The background of oxygen is subtracted using straight lines.

(4) The background of nitrogen is estimated from a signal from a sample without nitrogen and subtracted.

(5) The concentration profile in the depth direction is determined by simulation fitting.

FIGS. 4 and 5 show variations in work function and resistivity observed when the related $RuO_x$ film and the capacitor electrode according to the present invention were thermally treated at 300 to 550° C., which are temperature loads generally imposed during formation of the dielectric film. The film thickness of the related $RuO_x$ film and the capacitor electrode according to the present invention were less than 10 nm. The concentrations of the nitrogen and oxygen atoms are uniform in the related $RuO_x$ film. The O/Ru ratio of the related $RuO_x$ film is 1.5 to 2.0. On the other hand, the capacitor electrode according to the present invention includes an Ru film, an $RuO_x$ film, and an RuON film in this order. The $RuO_x$ film includes position A, and the RuON film contains the nitrogen atoms.

In FIG. 4, the work function was calculated using an ultraviolet Kelvin probe device. Excitation light electrons resulting from irradiation with ultraviolet light were measured to calibrate the work functions of samples. In FIG. 5, the resistivity was measured using Loresta GP Model MCP-T6000 manufactured by Mitsubishi Chemical Corporation and determined by a four-terminal method according to JIS-R-1637.

FIG. 4 shows that for the related $RuO_x$ film, the work function decreases gradually as the thermal treatment temperature varies from 300 to 550° C. and particularly decreases rapidly at a temperature higher than 400° C. In contrast, for the capacitor electrode according to the present invention, the work function is almost constant regardless of the thermal treatment temperature, resulting in exhibiting high heat resistance.

FIG. 5 shows that for the related $RuO_x$ film, the resistivity increases gradually as the thermal treatment temperature varies from 300 to 550° C. and particularly increases rapidly at a temperature higher than 400° C. In contrast, for the capacitor electrode according to the present invention, the resistivity is almost constant regardless of the thermal treatment temperature, resulting in exhibiting high heat resistance.

In the capacitor electrode including the Ru film, the $RuO_x$ film with position A, and the RuON film in this order, a work function is high, heat resistance is excellent, and low resistivity appropriate for the excellent heat resistance is offered. The reason is expected to be as follows. That is, the work function can be made higher by introducing oxygen into Ru to form $RuO_x$ than by using unitary Ru. However, $RuO_x$ offers low heat resistance and is changed, by thermal treatment, into $RuO_4$, which is easily volatilized. The thermal instability of $RuO_x$ is expected to result from an oxygen defect in $RuO_x$, which is thus easily oxidized. Thus, the RuON film is formed on the other surface of the $RuO_x$ film by nitridizing $RuO_x$ to eliminate the oxygen defect. This enables prevention of possible volatilization to improve the heat resistance. Furthermore, RuON offers a higher work function than $RuO_x$. Thus, forming the RuON film as described above enables the work function of the whole capacitor electrode to be further increased. Moreover, the Ru film is formed on the other surface of the $RuO_x$ film according to desired characteristics of the capacitor electrode. This enables prevention of possible volatilization of the $RuO_x$ film to improve the heat resistance.

On the other hand, the RuON film offers excellent heat resistance and a high work function. Thus, the capacitor electrode may be entirely composed of the RuON film. However, when the capacitor electrode is entirely composed of the RuON film, the capacitor electrode as a whole exhibits an improved work function but offers an increased resistivity because the resistivity of RuON is higher than that of $RuO_x$. The reason for the difference in resistivity is expected to be that for $RuO_x$, an oxygen defect causes carriers to be generated to induce electric conduction, whereas for the RuON film, the nitrodization eliminates the carriers.

Thus, in connection with a tradeoff among the resistivity, work function and thermal stability of the capacitor electrode as a whole, the capacitor electrode includes the Ru film, the $RuO_x$ film with position A, and the RuON film in this order. Then, the capacitor electrode offers an increased work function, proper heat resistance, and reduced electric resistance.

In the capacitor electrode including the Ru film, the $RuO_x$ film with position A, and the RuON film in this order, the film thickness of the Ru film is preferably 1 to 3 nm. The film thickness of the $RuO_x$ film is preferably 3 to 6 nm. The film thickness of the RuON film is preferably more than 0.1 nm and 4 nm or less.

The range of the average composition of Ru and O in the $RuO_x$ film is preferably $1<O/Ru<2$. The range of the average composition of Ru, O, and N in the RuON film is preferably $5<N/(N+Ru+O)<30$ and $1<O/(Ru+O)<2$.

2. Method for Manufacturing a Capacitor Electrode

A method for manufacturing a capacitor electrode comprises:

(1) forming an Ru film on a silicon substrate;

(2) forming an $RuO_x$ film on the Ru film; and (3) forming an RuON film on the $RuO_x$ film.

By thus depositing the Ru film, the $RuO_x$ film, and the RuON film in at least the three respective stages, a capacitor electrode with the desired composition profile and characteristics can be deposited stably and accurately. In step (2), a new $RuO_x$ film may be formed on the Ru film or the Ru film already formed in step (1) may partly be formed into the $RuO_x$ film. Similarly, in step (3), a new RuON film may be formed on the $RuO_x$ film or the $RuO_x$ film already formed in step (2) may partly be formed into the RuON film.

Preferably, in step (1), the Ru film is formed on the silicon substrate by using an ALD (Atomic Layer Deposition) method to carry out a plurality of cycles, each cycle including sub-steps (1a) to (1d) described below.

(1a) feeding an Ru material gas onto the silicon substrate to form the Ru film on the silicon substrate;

(1b) purging the Ru material gas;

(1c) feeding an $O_2$ gas onto the Ru film; and (1d) purging the $O_2$ gas.

Thus, in step (1), by forming the Ru film by using the ALD method to carry out the plurality of cycles, a thin-film electrode can be manufactured accurately and stably. In sub-step (1c), the $O_2$ gas is fed on the Ru film in order to remove organisms generated during the formation of the Ru film.

The "ALD (Atomic Layer Deposition) method" involves cycles each including supplying a first material gas for deposition, purging the first material gas, supplying a second material gas to allow the second material to react with the first material, and then purging the second material gas. Each cycle of the ALD method enables a layer of one atom or molecule to be formed.

Steps (2) and (3) are preferably carried out by a first method or a second method.

First Method:

In step (2), an $O_3$ gas is fed onto the Ru film to react part of Ru making up the Ru film with $O_3$ to form the $RuO_x$ film on the Ru film, and in step (3), an $NH_3$ gas is fed onto the $RuO_x$ film to react part of $RuO_x$ making up the $RuO_x$ film with $NH_3$ to form the RuON film on the $RuO_x$ film.

In step (2) of the first method, the Ru film previously formed in step (1) is partly formed into the $RuO_x$ film. In step (3) of the first method, the $RuO_x$ film previously formed in step (2) is partly formed into the RuON film.

Second Method:

In step (2), the $RuO_x$ film is formed by using the ALD (Atomic Layer Deposition) method to carry out a plurality of cycles, each cycle including sub-steps (2a) to (2d) described below:

(2a) feeding an Ru material gas to form a first Ru film;

(2b) purging the Ru material gas;

(2c) feeding a first reaction gas comprising at least one of $O_2$ gas and $O_3$ gas onto the first Ru film to react the first Ru film with the first reaction gas to convert the first Ru film into a first $RuO_x$ film; and (2d) purging the first reaction gas, and in step (3), the RuON film is formed by using the ALD (Atomic Layer Deposition) method to carry out a plurality of cycles, each cycle including sub-steps (3a) to (3e) described below, (3a) feeding an Ru material gas to form a second Ru film;

(3b) purging the Ru material gas;

(3c) feeding a second reaction gas comprising at least one of $O_2$ gas and $O_3$ gas onto the second Ru film to react the second Ru film with the second reaction gas to convert the second Ru film into a second $RuO_x$ film;

(3d) purging the second reaction gas; and (3e) feeding an $NH_3$ gas onto the second $RuO_x$ film to react the second $RuO_x$ film with the $NH_3$ gas to convert the second $RuO_x$ film into the RuON film.

First Exemplary Embodiment

As a first exemplary embodiment, an example of the manufacturing method will be described with reference to FIG. 2. The present exemplary embodiment corresponds to the above-described first method.

First, a silicon substrate is prepared, and the Ru film is deposited on the silicon substrate by the ALD (Atomic Layer Deposition) method. This step is shown below.

Step of depositing the Ru film:

(1a) The silicon substrate is installed in a reaction chamber and then heated to 300° C. The Ru material gas is fed into the reaction chamber for a time ranging from a time equal to or shorter than 20 ms to 1 s.

(1b) Then, the Ru material gas in the reaction chamber is purged.

(1c) Thereafter, the $O_2$ gas is fed into the reaction chamber for 3 seconds or less.

(1d) Thereafter, the $O_2$ gas in the reaction chamber is purged.

One cycle of sub-steps (1a) to (1d) allows the Ru film to be deposited to a thickness of about 0.1 nm. In the present exemplary embodiment, 100 cycles are carried out to deposit the Ru film of thickness 10 nm.

Thereafter, an oxidization treatment is performed to convert surface of the Ru film into the $RuO_x$ film (FIG. 2(b)). In this case, the $RuO_x$ is formed so as to include position A, where the oxygen exhibits the highest concentration in the $RuO_x$ film. This step is shown below.

Step of depositing the $RuO_x$ film:

$O_3$ is allowed to react with part of Ru making up the Ru film obtained as described above, for 5 to 100 seconds to deposit the $RuO_x$ film such that the $RuO_x$ film exhibits the highest oxygen concentration value. In this step, deposition conditions may be changed during the step or may be constant.

Then, a nitridization treatment is carried out (FIG. 2(c)) to convert a surface of the $RuO_x$ film into the RuON film (FIG. 2(d)). This step is shown below.

Step of depositing the RuON film:

The $NH_3$ gas is fed onto the $RuO_x$ film to allow $NH_3$ to react with part of $RuO_x$ making up the $RuO_x$ film to nitridize only a surface side of the $RuO_x$ film to convert the RuON film. Conditions for the nitridization treatment may include, for example, 550° C. and 30 minutes.

As described above, the capacitor electrode with the intended composition profile can be deposited. The film thickness of the capacitor electrode is about 10 nm.

Second Exemplary Embodiment

As a second exemplary embodiment, another example of the manufacturing method will be described with reference to FIG. 3. The present exemplary embodiment corresponds to the above-described second method.

The present exemplary embodiment is the same as the first exemplary embodiment in that the Ru film is deposited by the ALD (Atomic Layer Deposition) method but differs from the first exemplary embodiment in that the $RuO_x$ film and the RuON film are deposited through a plurality of cycles by the ALD method.

An example of this method of forming a capacitor electrode is as follows. Step of depositing the Ru film (FIG. 3(a)):

(1a) The silicon substrate is installed in a reaction chamber and then heated to 300° C. The Ru material gas is fed into the reaction chamber for a time ranging from a time equal to or shorter than 20 ms to 1 s.

(1b) Then, the Ru material gas in the reaction chamber is purged.

(1c) Thereafter, the $O_2$ gas is fed into the reaction chamber for 3 seconds or less.

(1d) Thereafter, the $O_2$ gas in the reaction chamber is purged.

One cycle of steps (1a) to (1d) allows the Ru film to be deposited to a thickness of about 0.1 nm.

Step of depositing the $RuO_x$ film (FIG. 3(b)):

(2a) The Ru material gas is fed into the reaction chamber for a time ranging from a time equal to or shorter than 20 ms to 1 s to form a first Ru film.

(2b) The Ru material gas in the reaction chamber is purged.

(2c) A first reaction gas made up of $O_2$ or $O_3$ is fed onto a first Ru film in the reaction chamber for at least 1 sec and less than 60 sec to react the first Ru film with the first reaction gas to convert the first Ru film into a first $RuO_x$ film.

(2d) The first reaction gas in the reaction chamber is purged.

One cycle of steps (2a) to (2d) allows the $RuO_x$ film to be deposited to a thickness of about 0.1 nm.

In this deposition step, the deposition conditions for, for example, sub-steps (2a) and (2d) may be changed for each cycle or may be constant. Step of depositing the RuON film (FIG. 3(c)):

(3a) The Ru material gas is fed into the reaction chamber for a time ranging from a time equal to or shorter than 20 ms to 1 s to form a second Ru film.

(3b) The Ru material gas in the reaction chamber is purged.

(3c) A second reaction gas made up of $O_2$ or $O_3$ is fed onto the second Ru film in the reaction chamber for at least 1 sec and less than 60 sec to react the second Ru film with the second reaction gas to convert the second Ru film into a second $RuO_x$ film.

(3d) A second reaction gas in the reaction chamber is purged.

(3e) A $NH_3$ gas is fed onto the second $RuO_x$ film in the reaction chamber to cause an $NH_3$ plasma treatment reaction for 10 seconds or less to convert the second $RuO_x$ film into a RuON film.

One cycle of steps (3a) to (3e) allows the RuON film to be deposited to a thickness of about 0.1 nm.

In this deposition step, the deposition conditions for, for example, sub-steps (3a), (3c), and (3e) may be changed for each cycle or may be constant.

Typically, the capacitor electrode with the intended composition profile can be deposited by consecutively carrying out a plurality of cycles of each of the Ru film deposition step, the $RuO_x$ film deposition step, and the RuON deposition step. For example, 20 cycles of the Ru film deposition step, 40 cycles of the $RuO_x$ film deposition step, and 20 cycles of the RuON deposition step can be carried out. Then, the film thickness of the resulting capacitor electrode is about 10 nm.

The method for manufacturing the capacitor electrode may use either the method in the first exemplary embodiment or the method in the second exemplary embodiment. Preferably, for example, the first exemplary embodiment is used to produce a lower capacitor electrode, and the second exemplary embodiment is used to produce an upper capacitor electrode.

3. Capacitor

A capacitor according to the present invention includes two capacitor electrodes and a dielectric film formed between the two capacitor electrodes and in contact with the first surfaces of the capacitor electrodes. That is, the capacitor includes the first capacitor electrode, the dielectric film formed in contact with the first surface of the first capacitor electrode, and the second capacitor electrode formed on the dielectric film so that the first surface of the second capacitor electrode contacts the dielectric film; the first capacitor electrode, the dielectric film, and the second capacitor electrode are arranged in this order.

FIG. 7 schematically shows an example of the capacitor according to the present invention. The capacitor includes two capacitor electrodes 3 and dielectric film 4 formed between two capacitor electrodes 3. Each of capacitor electrodes 3 is located so that first surface 2 of capacitor electrode 3 contacts dielectric film 4.

The dielectric film used preferably offers a dielectric constant of 40 or more and 1,000 or less. The use of the dielectric film with such a high dielectric constant provides a capacitor which can be miniaturized and which prevents a possible leakage current.

The dielectric film preferably contains at least one type of material selected from a group consisting of $SrTiO_3$, $TiO_2$, $La_2O_3$, $Y_2O_3$, $HfO_2$, $ZrO_2$, and (Ba, Sr) $TiO_3$. A typical composition of (Ba, Sr)$TiO_3$ may be $Ba_xSr_yTiO_3$ ($0.1 \leq x \leq 0.7$ and $0.3 \leq y \leq 0.9$). Preferably, a dielectric film composed particularly of $SrTiO_3$ and offering a high dielectric constant can be used to easily form a high-performance capacitor.

Furthermore, a high-performance DRAM memory cell can be easily formed by electrically connecting the capacitor formed using the present invention to a MOS transistor by well-known means. FIGS. 8 and 9 are diagrams illustrating an example of memory cells in a DRAM including the capacitor according to the present invention. FIG. 8 is a schematic plan view of the memory cells in the DRAM. For simplification, FIG. 8 shows only a part of the structure which is located below the capacitor. FIGS. 9(a) and 9(b) are sectional views taken along lines A-A and B-B in FIG. 8.

Portions 11 enclosed by ellipses in FIG. 8 show source/drain regions of field effect transistors regularly arranged in a memory cell region. Bit contact plug 14 and capacitor contact plug 17 are electrically connected to a bit line and the capacitor, respectively.

In FIG. 9, a gate electrode of the field effect transistor is shown at 28 and functions as a word line in the DRAM. Impurities are doped into source/drain regions 20 arranged opposite each other across gate electrode (word line) 28. The adjacent source/drain regions are isolated from each other by isolation region 21 formed using an STI (Shallow Trench Isolation) method.

Capacitor contact plug 26 and bit contact plug 29 both formed by burying a conductor are formed on source/drain regions 20 formed opposite each other across gate electrode 28. More specifically, bit contact plug 29 is formed so as to extend through insulating layer 27 to the source/drain region. Bit line 25 is electrically connected to bit contact plug 29. Capacitor contact plug 26 is formed to extend through insulating layer 27 to source/drain region 20. Capacitor contact plug 26 electrically connects the capacitor to source/drain region 20.

The capacitor is composed of lower electrode 24, dielectric film 22, and upper electrode 23 formed in this order. Dielectric film 22 is located so as to contact lower electrode 24 and upper electrode 23 via a first surface of lower electrode 24 and a first surface of upper electrode 23.

In FIG. 9, one memory cell is composed of one gate electrode formed on a semiconductor region, the source-drain regions formed opposite each other across the gate electrode, bit contact plug 29, electrically connected to one of impurity diffusion regions, capacitor contact plug 26, electrically connected to another of impurity diffusion regions, the capacitor, and the like. Thus, FIG. 9(b) shows two memory cells. Bit contact plug 29 is located so that bit contact plug 29 is shared by the two memory cells. Similarly, in FIG. 8, a portion (the portion 11 enclosed by the ellipse and a structure formed on the part) composed of two capacitor contact plugs 17, one bit contact plug 14, the two gate electrodes, and the like makes up two memory cells.

Furthermore, the capacitor according to the present invention is applicable to any semiconductor devices other than the DRAMs without limitation provided that the semiconductor device uses the capacitor.

It is apparent that the present invention is not limited to the above embodiments, but may be modified and changed without departing from the scope and spirit of the invention.

What is claimed is:

1. A capacitor comprising:
   two electrodes, each electrode including a first surface and a second surface which are arranged facing each other; and
   a dielectric film formed between said two electrodes in contact with the first surface of each electrode,
   wherein at least one electrode of the two electrodes contains oxygen atoms and nitrogen atoms,
   the at least one electrode having a maximum oxygen atom concentration at a depth A as measured between the first surface and the second surface in a thickness direction,
   the nitrogen atoms are present only at depths closer to the first surface than the depth A, and
   the at least one electrode comprises a laminate film of an Ru film, an RuOx film, and an RuON film in this order,
   the Ru film includes the second surface,
   the RuOx film includes the depth A, and
   the RuON film includes the first surface.

2. The capacitor according to claim 1, wherein the dielectric film comprises at least one type of material selected from a group consisting of $SrTiO_3$, $TiO_2$, $La_2O_3$, $Y_2O_3$, $HfO_2$, $ZrO_2$, and $(Ba, Sr)TiO_3$.

3. The capacitor according to claim 1,
   wherein a thickness of the RuOx film is from 3 to 6 nm, and a thickness of the RuON film is from 0.1 nm to 4 nm.

4. The capacitor according to claim 3,
   wherein a thickness of the Ru film is from 1 to 3 nm.

5. The capacitor according to claim 1,
   wherein a ratio O/Ru, which is a composition ratio of the oxygen atom O and Ru in the RuOx film, is more than 1 and less than 2.

6. A capacitor including an electrode,
   wherein the electrode comprises:
   a first layer containing an Ru;
   a second layer containing an Ru and an oxygen atom, the second layer being in contact with the first layer; and
   a third layer containing an Ru, an oxygen atom, and a nitrogen atom, the third layer being in contact with the second layer.

7. The capacitor according to claim 6,
   wherein the first layer comprises a Ru film;
   the second layer comprises an RuOx film; and
   the third layer comprises an RuON film.

8. The capacitor according to claim 7,
   wherein a thickness of the RuOx film is from 3 to 6 nm, and a thickness of the RuON film is from 0.1 nm to 4 nm.

9. The capacitor according to claim 6,
   wherein a ratio O/Ru, which is a composition ratio of the oxygen atom O and Ru in the second layer is more than 1 and less than 2.

10. The capacitor according to claim 9, further comprising a dielectric film on the third layer,
    wherein the dielectric film includes at least one material selected from the group consisting of $SrTiO_3$, $TiO_2$, $La_2O_3$ and $Y_2O_3$.

* * * * *